W. LEROUX.
AUTOMOBILE SPRING.
APPLICATION FILED SEPT. 2, 1916.
1,233,675.
Patented July 17, 1917.
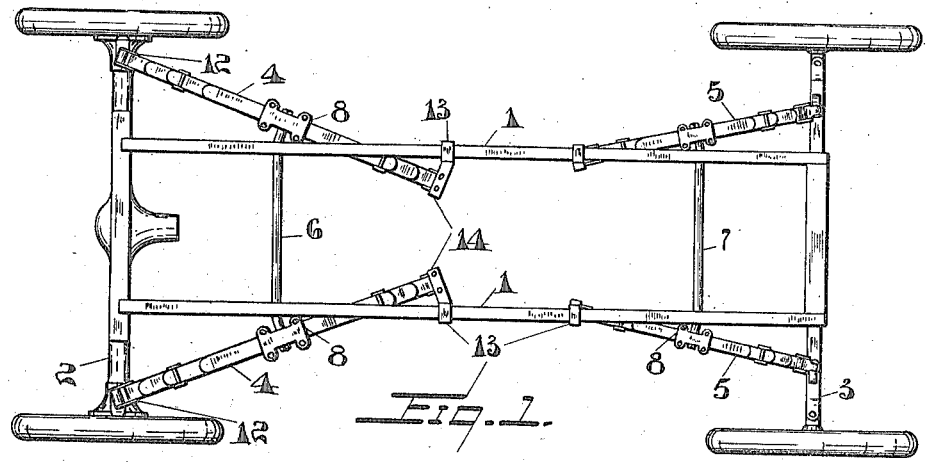
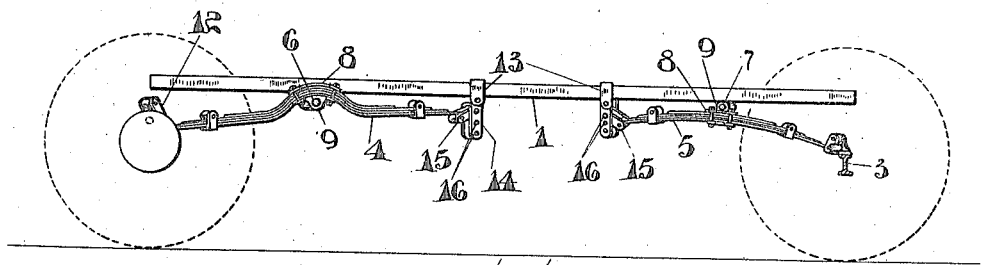
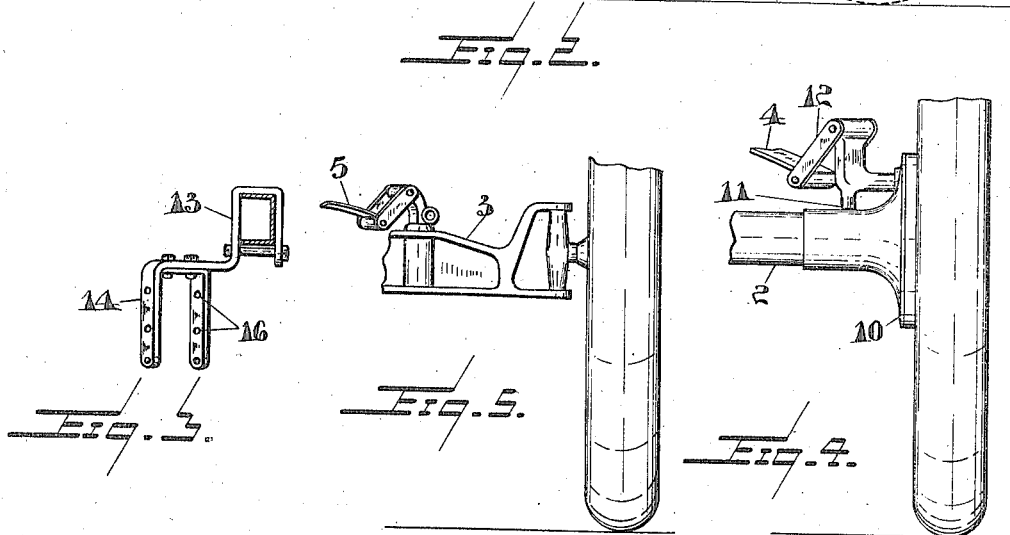
WITNESSES.
N. R. Tyndall.
Geo. P. Mackie.
INVENTOR.
W. Leroux.
BY J. Edward Maybee
ATTY.

UNITED STATES PATENT OFFICE.

WILFRED LEROUX, OF WEYBURN, SASKATCHEWAN, CANADA.

AUTOMOBILE-SPRING.

1,233,675.  Specification of Letters Patent.  Patented July 17, 1917.

Application filed September 2, 1916. Serial No. 118,207.

*To all whom it may concern:*

Be it known that I, WILFRED LEROUX, of the city of Weyburn, in the Province of Saskatchewan, Dominion of Canada, a subject of the King of Great Britain, have invented certain new and useful Improvements in Automobile-Springs, of which the following is a specification.

This invention relates to the spring suspension employed to connect the chassis of a motor car with the front and rear axles, and my object is to devise means for utilizing the semi-elliptic transverse springs of light cars, such as the Ford, as cantaliver springs, thus enabling the owner of such a car to change to cantaliver spring suspension with very little trouble, and by the use of readily procurable parts.

I attain my object by means of the constructions hereinafter described and illustrated in the accompanying drawings in which—

Figure 1 is a plan view showing part of the frame and running gear of a motor car provided with my improved spring suspension;

Fig. 2 a side elevation of the same;

Fig. 3 a rear elevation of one of the adjustable clips and hangers connected with the side sills of the frame;

Fig. 4 a rear elevation of the connections between the rear end of one of the rear springs on the rear axle; and Fig. 5 a similar view of the connection between the forward end of one of the forward springs and the front axle.

In the drawings like numerals of reference indicate corresponding parts in the different figures.

Referring particularly to Figs. 1 and 2, 1 are the side sills of the frame of the car, 2 the rear axle and 3 the front axle. 4 are the rear springs and 5 the front springs. The rear springs 4 are semi-elliptic springs such as employed in the Ford car, in which a single rear spring is employed transversely of the chassis. The front springs are also semi-elliptic, such as are used singly transversely of the chassis in the Ford car.

6 and 7 are cross bars or axles secured to the side sills of the chassis transversely of the car. The ends of these axles are formed as pivots for connection with the middle portions of the springs. The springs are preferably set at an angle to the side sills as shown in Fig. 1, so as to clear certain parts of the car or its attachments, particularly the brackets which support the running board of the car. These parts are, however, not shown as they are of ordinary construction.

As four springs are employed instead of two, one or more leaves will be removed from each spring to reduce its stiffness.

To the center of each spring is secured a clip 8 carrying a bearing 9 adapted to pivot on the ends of the cross bars 6 and 7. Owing to the springs being set at an angle to the side sills as shown, the ends of the bars 6 and 7 are bent as shown in Fig. 1. The rear end of each spring is connected with the rear axle by means of a perch and hanger shown more particularly in Fig. 4. While this perch and hanger may be of any construction, I find the form shown preferable, being a slight variation of that used in the Ford car. This perch is bolted to the disk 10 of the rear axle and is provided with a supporting leg 11 resting on the axle. A hanger 12 is pivotally connected with the end of the spring and the perch as shown.

The rear ends of the front springs and the forward ends of the rear springs are connected with the side sills by means of clips and hangers such as shown in Fig. 3. A clip 13 is secured to the side sill and is provided with depending parts 14 to which the upper ends of the hangers 15 are pivotally connected, the lower ends of the hangers being pivotally connected with the spring ends. It will be noted that several pairs of holes 16 are provided in each hanger to provide adjustment in case the springs break or are flattened in use.

By the arrangement shown I obtain all the advantages of cantaliver spring suspension and at the same time use only parts which are at present obtainable from the service departments of manufacturers of such cars as the Ford, and a few simple parts which are readily supplied specially to anyone desiring to change the spring suspension of his car.

What I claim as my invention is:—

1. The combination with a motor car chassis frame and an axle of a semi-elliptic spring; a bearing clip secured to the middle of the spring; a pivot secured to the side sill of the frame on which the bearing clip is pivoted; a perch secured to the upper side of the axle; a hanger pivotally connected to the perch and spring end; a clip secured to the side sill of the frame; and means for securing the other end of the aforesaid spring to said clip at any one of a plurality of vertically spaced positions.

2. The combination with a motor car chassis frame and rear axle of a semi-elliptic spring set at an angle to the side sill of the frame, one end being adjacent to the sill; a bearing clip secured to the middle of the spring; a pivot secured to the side sill of the frame on which the bearing clip is pivoted; a perch secured to the upper side of the axle close to the wheel; a hanger pivotally connected to the perch and spring end; and a clip secured to the side sill of the frame to which clip the other end of the aforesaid spring is connected, said spring being abruptly arched at its center.

Signed at Weyburn in the Province of Saskatchewan, Canada this seventeenth day of August, 1916.

WILFRED LEROUX.

Witnesses:
 JAMES HEGGIE,
 MARY WALFORD.

Copies of this patent may be obtained for five cents each, by addressing the "Commissioner of Patents, Washington, D. C."